US012507013B2

(12) United States Patent
Pilgaard Havemann

(10) Patent No.: US 12,507,013 B2
(45) Date of Patent: Dec. 23, 2025

(54) LOUDSPEAKER CONE WITH A FLEXIBLE CIRCUIT BOARD

(71) Applicant: Harman International Industries, Incorporated, Stamford, CT (US)

(72) Inventor: Marcel Pilgaard Havemann, Hjerm (DK)

(73) Assignee: Harman International Industries, Incorporated, Stamford, CT (US)

( * ) Notice: Subject to any disclaimer, the term of this patent is extended or adjusted under 35 U.S.C. 154(b) by 196 days.

(21) Appl. No.: 18/519,666

(22) Filed: Nov. 27, 2023

(65) Prior Publication Data

US 2025/0175742 A1 May 29, 2025

(51) Int. Cl.

| | |
|---|---|
| ***H04R 7/16*** | (2006.01) |
| ***F21V 33/00*** | (2006.01) |
| ***H04R 7/12*** | (2006.01) |
| ***H04R 9/02*** | (2006.01) |
| ***H04R 9/06*** | (2006.01) |

(52) U.S. Cl.

CPC ........... *H04R 7/16* (2013.01); *F21V 33/0056* (2013.01); *H04R 7/12* (2013.01); *H04R 9/025* (2013.01); *H04R 9/06* (2013.01)

(58) Field of Classification Search

CPC . H04R 7/16; H04R 7/12; H04R 9/025; H04R 9/06; H04R 3/00; H04R 1/028; F21V 33/0056

See application file for complete search history.

(56) References Cited

U.S. PATENT DOCUMENTS

| | | | | |
|---|---|---|---|---|
| 2011/0002500 | A1 | 1/2011 | Park | |
| 2014/0193016 | A1* | 7/2014 | Faerstain | H04R 7/045 348/51 |
| 2016/0234601 | A1 | 8/2016 | Yuasa et al. | |
| 2019/0202290 | A1 | 7/2019 | Havemann | |
| 2021/0155155 | A1 | 5/2021 | Havemann | |

OTHER PUBLICATIONS

Extended European Search Report for Application No. 24210795.1, dated Aug. 8, 2025, 10 pages.

* cited by examiner

*Primary Examiner* — Tuan D Nguyen
(74) *Attorney, Agent, or Firm* — Brooks Kushman P.C.

(57) ABSTRACT

In at least one embodiment, a loudspeaker assembly including a magnetic assembly and a diaphragm is provided. The diaphragm includes a plurality of electronics positioned directly thereon. The diaphragm generates an audio output and is moved along a first axis in response to the magnetic assembly being energized with an input signal.

6 Claims, 3 Drawing Sheets

LOUDSPEAKER CONE WITH A FLEXIBLE CIRCUIT BOARD

TECHNICAL FIELD

Aspects disclosed herein generally relate to a flexible loudspeaker cone including a flexible circuit board. These aspects and others will be discussed in more detail herein.

BACKGROUND

The notion of combining illumination along with loudspeakers is generally advantageous as loudspeaker manufacturers can include both the illumination and audio driver as a single integrated unit. Further, by combining illumination along with loudspeakers, it is possible for loudspeaker manufacturers to provide a controlled user experience. In some cases, this may be difficult to achieve and may be very time consuming for manufacturers in ensuring that homogeneity between the lighting and the audio output of the speakers falls within specific requirements.

SUMMARY

In at least one embodiment, a loudspeaker assembly including a magnetic assembly and a diaphragm is provided. The diaphragm includes a plurality of electronics positioned directly thereon. The diaphragm generates an audio output and is moved along a first axis in response to the magnetic assembly being energized with an input signal.

In at least one embodiment, a loudspeaker assembly including a magnetic assembly and a diaphragm. The diaphragm includes a plurality of lighting elements positioned directly thereon to illuminate light therefrom. The diaphragm generates an audio output and is moved along a first axis in response to the magnetic assembly being energized with an input signal.

In at least one embodiment, a loudspeaker assembly including a magnetic assembly and a diaphragm. The diaphragm includes a flexible circuit board having a plurality of electronics positioned directly thereon. The diaphragm generating an audio output and is moved along a first axis in response to the magnetic assembly being energized with an input signal.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
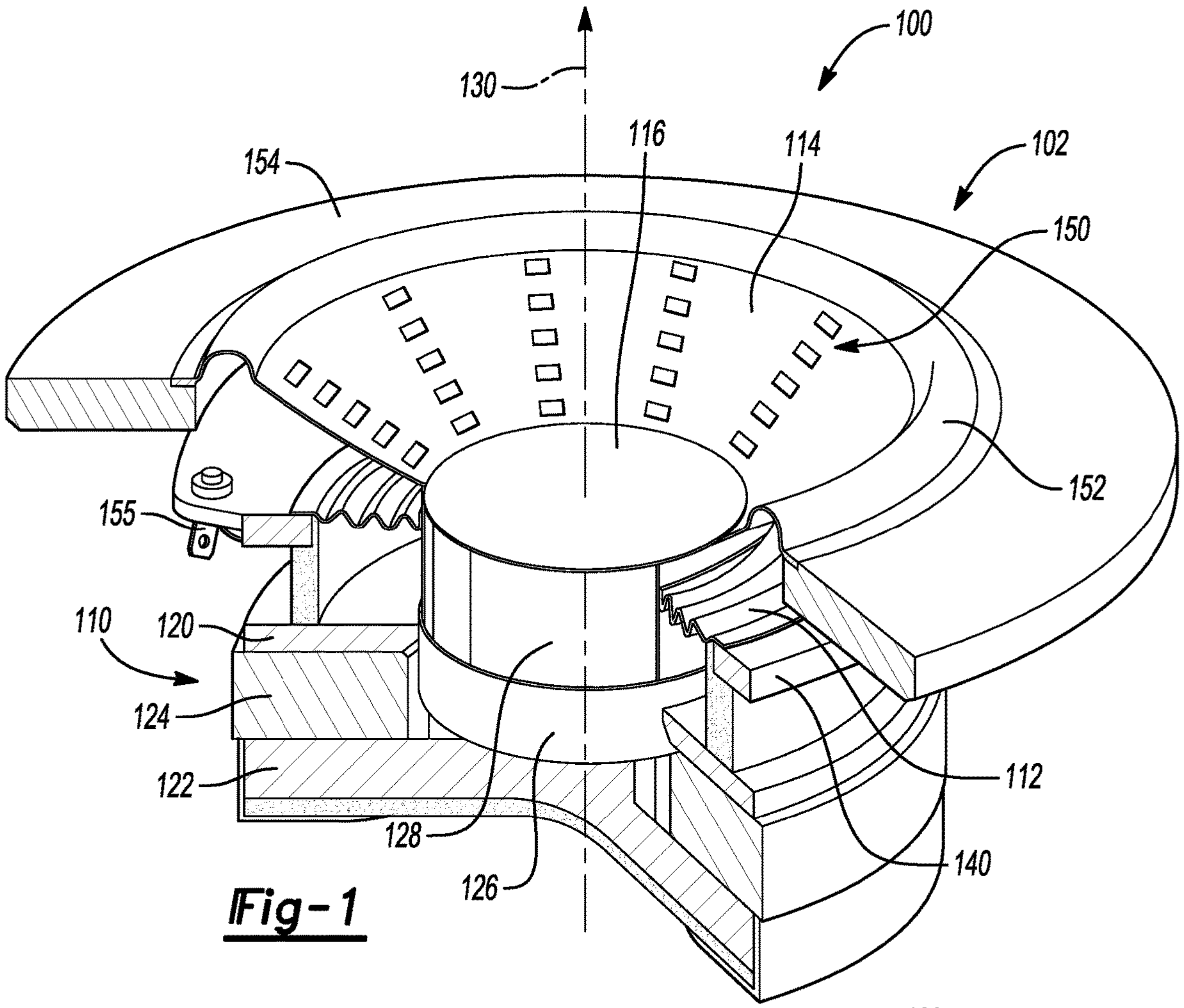
FIG. 1 illustrates a loudspeaker assembly in accordance with one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. It is recognized that one or more of the Figures may include reference to similar reference numerals and these reference numerals may be similar to one another unless otherwise stated. Similarly, if the reference numerals are introduced with one or more of the Figures, such reference numerals may not be referenced for other Figures where they appear if there is no change in their respective function and/or structure.

Embodiments disclosed herein generally provide a loudspeaker assembly that includes, among other things, a flexible printed circuit board (PCB). The PCB may include a plurality of lighting devices, such as but not limited to, light emitting diodes (LEDs) that enable new user experiences. Such user experiencers may include animations and other visual stimulants to be displayed. The flexible PCB may also include other components such as transceivers that enable Near Field Communication (NFC), batteries (or power storage devices), etc.

FIG. 1 illustrates a loudspeaker assembly 100 in accordance with one embodiment. The loudspeaker assembly 100 includes a loudspeaker 102 that is configured to generate audio output signals into a listening environment and to also display any number of lighting configurations (e.g., sequences) that illuminate in either a synchronized or non-synchronized manner with respect to the audio output signals. The loudspeaker assembly 102 includes a magnetic assembly 110, a spider 112, and a diaphragm 114, and a loudspeaker cap 116. The magnetic assembly 110 includes a first plate 120, a magnet 122, a second plate 124, and a voice coil 126. The voice coil 126 generally surrounds a center post 128. The spider 112, the diaphragm 114, the first plate 120, the magnet 122, the second plate 124, the voice coil 126, and the center post 128 are radially centered along a first axis 130 that extends through the loudspeaker assembly 100. An air gap 132 is generally formed between the voice coil 126 and the magnet 122.

In general, the magnetic assembly 110 is generally configured to move vertically in both directions. For example, the magnetic assembly 110 (e.g., the voice coil 126), when energized (e.g., when the loudspeaker assembly 100 receives an AC based input signal), generates a magnetic field that crosses the air gap 132 and interacts with a magnetic field generated by the first plate 120, the magnet 122, and the second plate 124. The center post 128 serves as a magnetic flux return path and receives a magnetic field from the first plate 120, the magnet 122, and the second plate 124. Thus, the travel of the magnetic field within the magnetic assembly 110 causes the magnetic assembly 110 to move vertically in both directions (e.g., upward and downward) along the first axis 130. This movement also causes the diaphragm 114 to move vertically in both directions along the first axis 130. The spider 112 includes a first end attached to the center post 128 and a second end attached to an outer rim 140 of the loudspeaker assembly 100. The spider 112 prevents the magnetic assembly 110 from rocking or tilting (i.e., cocking) about the first axis 130.

The diaphragm 114 may include a plurality of lighting elements 150 positioned thereon that illuminate. In one example, the lighting elements 150 are generally configured to illuminate when the loudspeaker 102 transmits an audio signal. In this regard, the lighting elements 150 may transmit light sequentially or non-sequentially. In addition, the lighting elements 150 may illuminate in a synchronized manner or in a non-synchronized manner relative to the audio transmitted by the loudspeaker 102. It is recognized however that the lighting elements 150 may also illuminate when audio is not being played back by the loudspeaker assembly 100. While FIG. 1 illustrates that the plurality of lighting elements 150 are distributed circumferentially and in a linearly manner in strips across the diaphragm 114, it is recognized that the lighting elements 150 may be orientated or arranged in any manner on the diaphragm 114. It is also recognized that the lighting elements 150 may be arranged in any pattern, logo, or text arrangement as desired.

In one example, the plurality of lighting elements 150 may be light emitting diodes (LEDs). The diaphragm 114 may be formed from a flexible printed circuit board (PCB). In this case, the plurality of lighting elements 150 may be positioned on the PCB. In one example, one or more controllers (not shown) may be positioned external to the loudspeaker 102 to transmit control signals to the plurality of lighting elements 150 to control such lighting elements 150 accordingly. The loudspeaker 102 may include an electrical connector 155 for receiving a mating connector (not shown) to provide the control signals from the one or more controllers positioned remote from the loudspeaker 102 to the lighting elements 150.

It is recognized that the other electronics may be positioned on the diaphragm 114 in other embodiments. For example, the one or more controllers (not shown) may be positioned on the diaphragm 114 for driving the lighting elements 150. The controllers may include current drivers for driving the lighting elements 150 to illuminate in any one or more colors based on the current drivers adjusting pulse width modulation (PWM) signals to the lighting elements 150. Additional electronics may also be positioned on the diaphragm 114 such as batteries (or power storage devices, etc.) and/or transceivers that enable bi-directional wireless communication to and from the loudspeaker 102. The transceivers may enable wireless communication via Near Field Communication (NFC) or other suitable communication devices.

The flexible circuit board of the diaphragm 114 surrounds the loudspeaker cap 116. The loudspeaker 102 includes a surround 152 that is formed on outer side. The loudspeaker 102 also includes a baffle 154 positioned on an outer surface thereof for receiving the surround 152. The baffle 154 is also radially centered along the first axis 130 and receives a first side of the surround 152. A second side of the surround 152 is directly attached with (or integrated with) the diaphragm 114. In generally, the surround 152 may be attached to the baffle 154. The surround 152 may be at least partially arcuate to enable the diaphragm 114 to move in both directions (upward and downward) along the first axis 130 when the surround 152 is attached to the baffle 154. The surround 152 may be formed of a flexible material such as, for example, rubber, foam, silicone or similar materials. It is generally contemplated that the surround 152 may include at least portion of the flexible circuit board formed therein. In this case it is also possible for the surround 152 to include the plurality of lighting elements 150 and/or other electronics positioned thereon.

In general, given that the PCB is flexible and forms the diaphragm 114, such a flexible PCB generally enables the diaphragm 114 to move (or vibrate) to generate the audio waves that are heard by a user. Similarly, the flexible PCB is configured to receive and retain the plurality of lighting elements 150 such that the lighting elements 150 illuminate one or more colors while the diaphragm 114 generates the audio output. The plurality of lighting elements 150 may be configured to generate the one or more lighting colors that coincide with a sequence or pattern that is either synchronized or not synchronized with the audio being transmitted from the loudspeaker 102.

Figure 2:
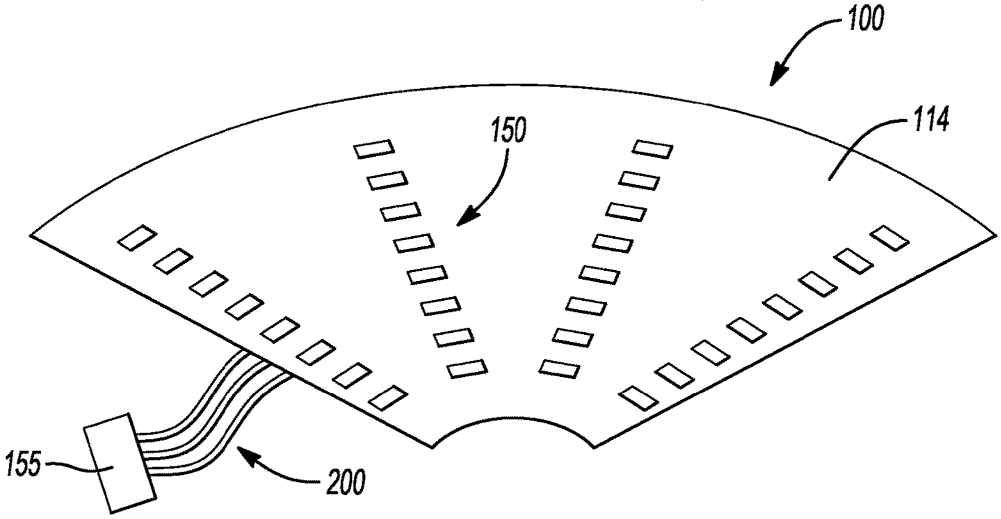
FIG. 2 illustrates a diaphragm of the loudspeaker assembly including a plurality of lighting elements in accordance with one embodiment.

FIG. 2 illustrates the diaphragm 114 of the loudspeaker assembly 100 including the plurality of lighting elements 150 in accordance with one embodiment. Similar to that illustrated in FIG. 1, the plurality of lighting elements 150 are arranged linearly, and in rows throughout the diaphragm 114. The diaphragm 114 that is generally formed of the flexible PCB as noted above in connection with FIG. 1, may also include a plurality of connection wires 200 positioned on a side opposite to the side of the flexible PCB that receives the lighting elements 150 thereon. In one example, the electrical connector 155 receives the plurality of connection wires 200 to electrically connect the plurality of lighting elements 150 to the one or more controllers (not shown) that control the lighting scheme for the plurality of lighting elements 150.

Figure 3:
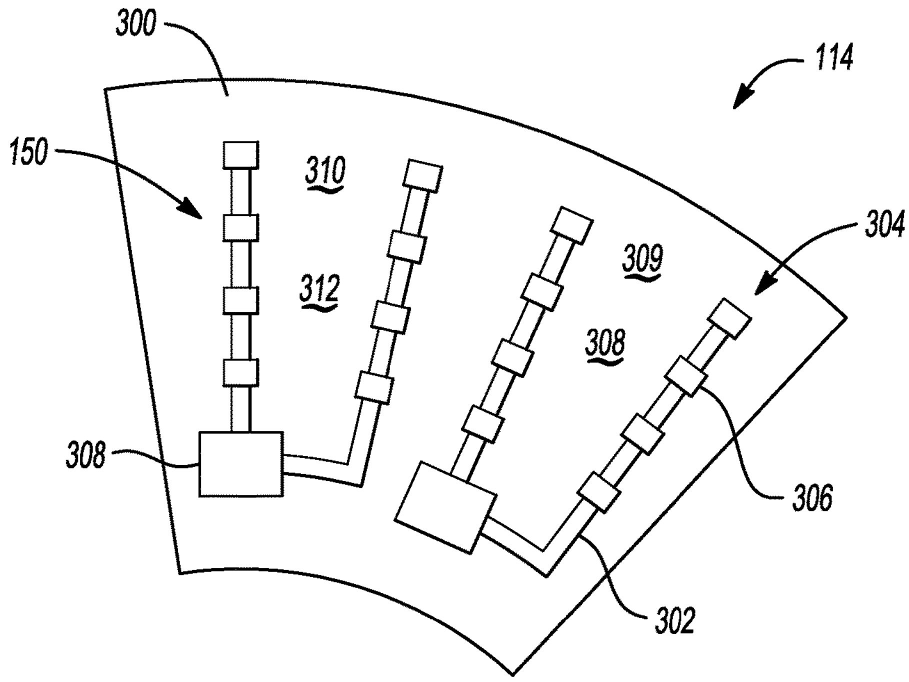
FIG. 3 illustrates a flexible circuit board of the loudspeaker assembly in accordance with one embodiment.

FIG. 3 illustrates a flexible circuit board 300 that forms the diaphragm 114 of the loudspeaker assembly 100 in accordance with one embodiment. The flexible circuit board 300 includes one or more electrical traces 302, electronics 304, and any number of conductive pads 306, electronic vias 310, and ground planes (or ground layers) 312 positioned within the board 300. The electronics 304 may comprise the various lighting elements 150 and controllers 308, etc. As noted above, the flexible circuit board 300 may be flexible (or compressible) enough to function as a loudspeaker diaphragm such that the diaphragm 114 vibrates (or travels in both an up and down direction) above the first axis 130. The conductive pads 306 may receive the various lighting elements 150 and the controllers 308. The electrical traces 302 may electrically couple the lighting elements 150 to the controllers 308. Similarly, the electrical traces 302 may transmit/receive signals to and from devices external to the flexible circuit board 300 via the connection wires 200. It is recognized that the flexible circuit board 300 may include any number of conductive layers 309, vias 310, ground layers 312, etc. The flexible circuit board 300 may include any number of layers where the vias 310 may electrically connect a plurality of the layers to one another. Similarly, the ground plane 312 may be used to provide a ground for the electrical traces 302, electronics 304, controllers 308, conductive layers 309, vias 310, etc.

Figure 4:
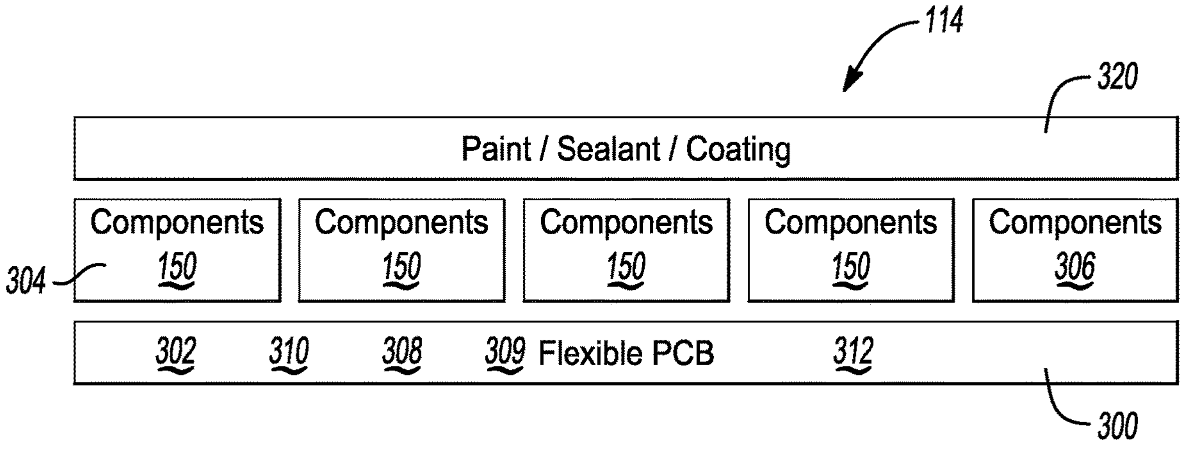
FIG. 4 illustrates a cross sectional view of a flexible circuit board of the loudspeaker assembly in accordance with one embodiment.

FIG. 4 illustrates a cross sectional view of the diaphragm 114 of the loudspeaker assembly 100 in accordance with one embodiment. As shown, the plurality of electronics 304 (e.g., lighting elements 150 and/or controller 308) are generally positioned on the flexible circuit board 300. The flexible circuit board 300 may also include the conductive pads 306 and the various layers (e.g., conductive layers, vias 310, ground layers 312,). A sealant 320 may be positioned over the electronics 304 (e.g., the lighting elements 150, controller(s) 308, etc.) and the layers of the flexible circuit board 300 to protect the diaphragm 114 from environmental conditions. The sealant 320 may comprise paint, a silicon coating, or other suitable coatings.

Figure 5:
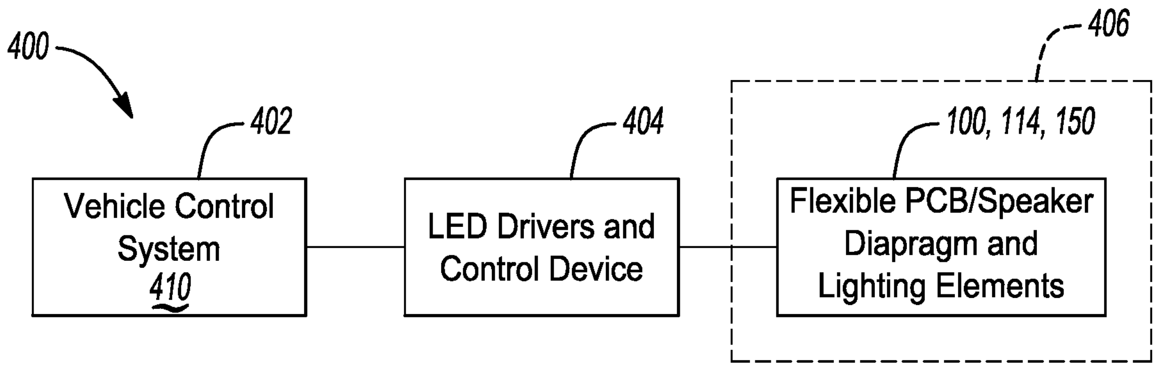
FIG. 5 illustrates a system that incorporates the loudspeaker assembly in accordance with one embodiment.

FIG. 5 illustrates a system 400 that incorporates the loudspeaker assembly 100 in accordance with one embodiment. The system 400 includes a vehicle audio control system 402, a plurality of electronics 404, and the loudspeaker assembly 100 as set forth above. The vehicle audio control system 402 includes at least one audio and lighting controller 410 (hereafter "the audio and lighting controller 410) that is programmed to generate an audio input signal for playback by the loudspeaker assembly 100. Similarly, the audio and lighting controller 410 may also transmit lighting control signals indicative of a lighting sequence including lighting colors and/or patterns. In one example, the plurality of electronics 404 include any number of controllers, control devices and lighting drivers to drive the plurality of lighting elements 150. The controller and/or control devices of the plurality of electronics 404 may be various control electronics associated with Local Interconnect Network (LIN) data communication, Controller Area Network (CAN) data communication, Automotive Audio Bus communication (A2B) or other suitable components that enable data transmission. In addition, the controller or control devices may receive data from the audio and lighting controller 410 that are indicative of commands or other data for illumination related properties. For example, the plurality of electronics 404 may also receive data corresponding to illumination intensity for the lighting elements 150 and/or data corresponding to the specific music, rhythm, and/or genre of music that is being played back by the audio and lighting controller 410, It is recognized that the audio and lighting controller 410 may transmit audio input signals and lighting input signals over the data communication bus such as a digital audio bus (e.g., A2B, LIN, or CAN, etc.) to the various controllers of the plurality of electronics 404. In turn, the controllers of the plurality of electronics 404 may process the digital data and provide signals indicative of the lighting input signals to the lighting drivers. The lighting drivers may transmit PWM signals or other signal indicative of the desired lighting scheme (or sequence) to the lighting elements 150 of the loudspeaker assembly 100. Similarly, the controllers of the plurality of electronics 404 may process the digital data and provide signals indicative of the audio input signal to the loudspeaker assembly 100 for audio playback. In this regard, it is recognized that the system 400 provides the plurality of electronics 404 remote from the loudspeaker assembly 100 (i.e., the plurality of electronics is not positioned on the flexible circuit board 300.

Figure 6:
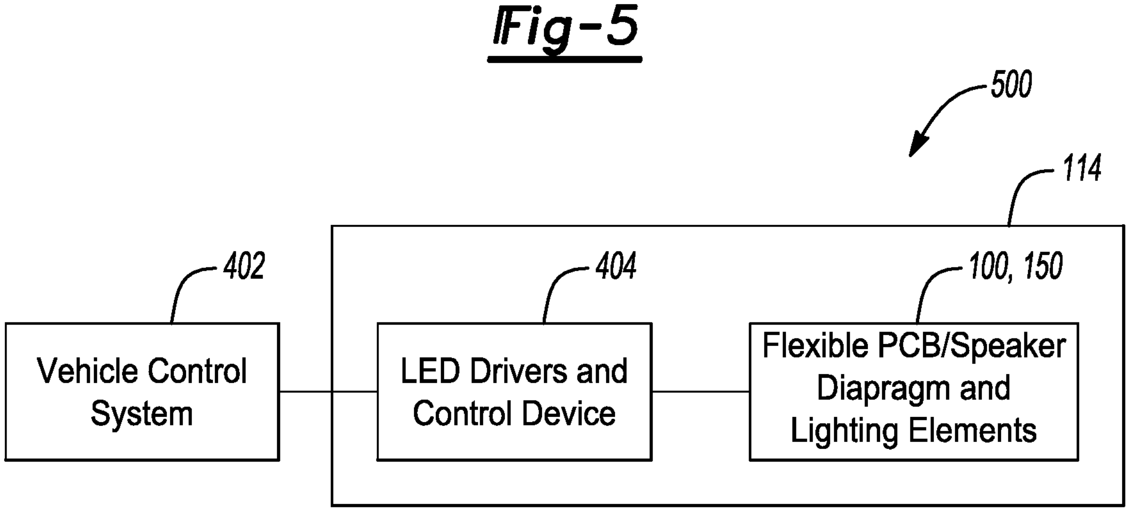
FIG. 6 illustrates another system that incorporates the loudspeaker assembly in accordance with one embodiment.

FIG. 6 illustrates a system 500 that incorporates the loudspeaker assembly 100 in accordance with one embodiment. The system 500 also includes the vehicle audio control system 402, a plurality of electronics 404, and the loudspeaker assembly 100 and operates in a similar manner to that described above in connection with FIG. 5. However, the system 500 incorporates one or more of the controllers, control devices and the lighting drivers of the plurality of electronics 404 directly on the on the flexible board of the diaphragm 114.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilize one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A loudspeaker assembly comprising:

a magnetic assembly; and a diaphragm including a plurality of lighting elements positioned directly thereon to illuminate light therefrom, the diaphragm generating an audio output and being moved along a first axis in response to the magnetic assembly being energized with an input signal, wherein the diaphragm includes a flexible circuit board to directly receive the plurality of lighting elements to project light from the diaphragm, wherein the diaphragm includes at least one electrical trace positioned on the flexible circuit board to enable electrical communication with the plurality of lighting elements.

2. The loudspeaker assembly of claim 1, wherein the diaphragm includes a coating positioned over the plurality of lighting elements to seal the plurality of lighting elements.

3. The loudspeaker assembly of claim 1, wherein the diaphragm further includes a plurality of drivers positioned on the flexible circuit board to provide control signals to the plurality of lighting elements to control the plurality of lighting elements to illuminate a plurality of colors.

4. The loudspeaker assembly of claim 1, wherein the flexible circuit board and the plurality of lighting elements are radially centered about the first axis.

5. The loudspeaker assembly of claim 4, wherein the first axis extends through the magnetic assembly, the diaphragm, and a center of loudspeaker cap.

6. The loudspeaker assembly of claim 5, wherein the flexible circuit board surrounds the loudspeaker cap.

* * * * *